Oct. 20, 1931.  H. A. FARRAND  1,828,401
RESILIENT RULE
Filed Oct. 21, 1926
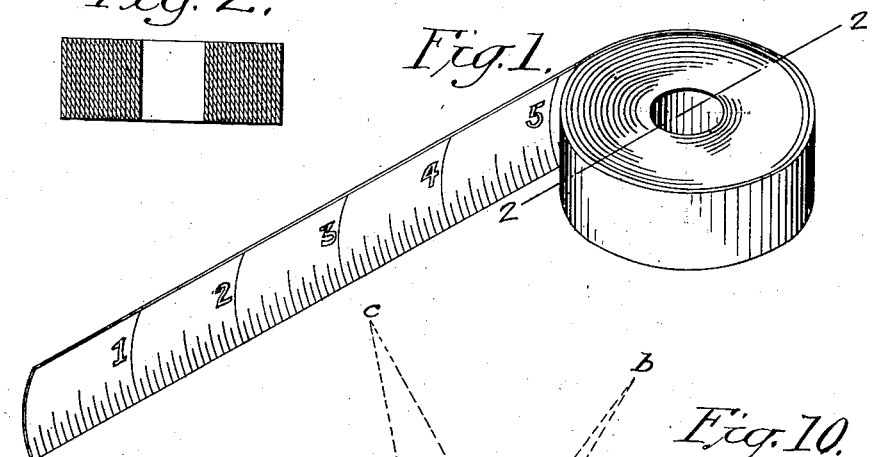
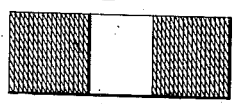
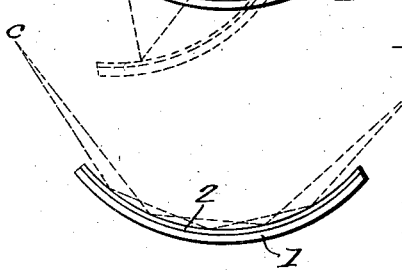
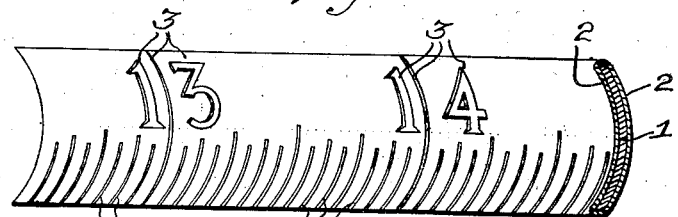
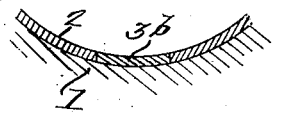
Inventor;
Hiram A. Farrand,
by his Attorneys,
Howson + Howson Patented Oct. 20, 1931

1,828,401

UNITED STATES PATENT OFFICE

HIRAM A. FARRAND, OF BERLIN, NEW HAMPSHIRE, ASSIGNOR TO HIRAM A. FARRAND, INC., OF BERLIN, NEW HAMPSHIRE, A CORPORATION OF NEW HAMPSHIRE

RESILIENT RULE

Application filed October 21, 1926. Serial No. 143,267.

My invention relates to resilient rules of the concavo-convex type, shown and described in my prior Patent No. 1,402,589, dated January 3, 1922. My present invention relates to means for increasing the strength and resiliency of the spring of which the rule is composed; for preventing corrosion thereof; for producing color contrast thereon; for illuminating the surface of the rule; and for creating on the rule a reflecting and light diffusing surface, the said means in its preferred form constituting a metallic plating applied to the spring or rule by the electro-plating process. The metallic plating may be of nickel or chromium, either of which presents a hard wear resisting surface capable of being polished to a highly reflective state.

Another feature of my invention is the process by which the markings of the rule are applied, viz: forming the markings on the spring by the use of non-conducting material before placing the spring in the electroplating bath as will be more fully disclosed hereinafter.

Referring to the drawings:

Fig. 1 is a perspective view of a partially coiled rule made in accordance with the principles of my invention;

Fig. 2 is a section on the line 2, 2 of Fig. 1;

Fig. 3 is an enlarged perspective view of a portion of the rule shown in Fig. 1;

Fig. 4 is a transverse sectional view of the rule drawn to an enlarged scale;

Figs. 5 and 6 are views similar to Fig. 4, illustrating alternate methods of strengthening the base spring;

Figs. 7 and 8 illustrate the different methods of producing color contrast on the rule by electro-plating, and Figs. 9 and 10 are diagrams illustrating the reflection and diffusion of light on the rule.

I am aware that, prior to my invention, herein described, springs have been produced having a concavo-convex form. But springs of this sort require great resiliency and are subject to extreme distortion. The material employed is usually steel, since this material is practically the only substance, commercially available, in a form adapted to conversion into concavo-convex shape. The use of brass or bronze is not adaptable for use for this particular type of spring, since these materials will not maintain their resiliency long under the extreme distortion to which it is subjected. Concavo-convex springs may be made from annealed high carbon steel, or other iron alloy, which is subjected to heat treatment after the concavo-convex form has been given to the strip. Relatively speaking, this is an expensive and difficult process. An alternate and less expensive method, that which I employ, consists in manipulating a flat ribbon of previously hardened spring steel in such manner, (beyond its elastic limit) that the molecular structure is distorted to the extent, that, it does not return to the flat shape, but retains a shape of the desired concavo-convex contour. It is to be noted, however, that such treatment is apt to so strain the fiber of the steel that the resiliency is less, thereafter, than before the deformation. Due to my invention, herein described, I am able to improve the strength of such a weakened spring.

The high carbon steel such as is ordinarily employed to make springs of this character is particularly subject to the destructive influence of rust and other corrosive agents. The thin wafer-like material from which these springs are made is quickly destroyed by a very slight coat of rust or corrosion. Ordinary protective coatings are not adaptable, in that, such coatings have insufficient adhesion to remain unaffected during the severe bending to which these springs are subjected. Also, the abrasive effect of rubbing along the surface of the spring holders when coiling, is apt to remove any ordinary coating such as a lacquer, varnish or other adhesive. One of the objects attained by use of my invention is the protection afforded against rust or other sources of deterioration, thereby preserving the strength added to the spring by the invention, above described.

A third advantage accruing to a concavo-convex spring by use of my invention, is the means afforded of placing designs and characters on the surface of the spring without resort to the weakening process of etching the metal. Etching of designs or characters on the face of such springs, where needed, is the ordinary means of obtaining such effects. To create any design by means of etching involves the eating away of portions of the superficial structure of the spring. This is commonly resorted to in the manufacture of measures such as steel tapes or other flat sections. And up to the time of my invention, this process was employed in the manufacture of concavo-convex measuring rules. But the steel in such rules is of such wafer-thin dimension the etched portion weakens the body of the rule, where cut away, while the inequalities in the thickness of the spring due to alternate etched and unetched portions serves to affect the bending along the length of the rule. Furthermore, the resiliency of the etched portion was apt to be less than that of the unetched portion. By the use of my invention, I am able to dispense with the process of etching entirely, and am able to secure the desired effect of designs and characters without appreciably weakening one portion over another. In addition to the improvement in strength and resilience the use of my invention increases the legibility of characters imposed upon the surface. Ordinarily etched characters are not easily read in darkened localities because of the lack of contrast between characters and background. By my invention I combine improved coloration with shape of the spring surface to heighten the color contrast and in such a way as to increase the effect of illumination in darkened localities.

Therefore, the objects of my invention are:

1. To improve the strength and resiliency of concavo-convex springs.

2. To provide a protective means for preserving the strength of such springs.

3. To provide means for retaining the uniform strength of the spring throughout its length.

4. To improve the legibility of characters or designs imposed upon the surface of such springs by contrasting coloration.

5. To improve the illumination of the designs or characters, and thus aid the reading of such in poorly lighted locations.

Figure 4 illustrates a cross section of a flexible concavo-convex spring in which 1 represents a core or base spring, having less than the requisite resiliency or strength. In explanation: certain advantages are secured in manufacture from the use of such a weakened spring. A thin material is less liable to warp or twist from end to end during the process of manufacture than a thick one of requisite strength. Also, an advantage lies in the process mentioned above in producing the spring from a flat strip of metal (steel) which has been previously heat treated, and this process of curving after heat treatment tends to reduce the resiliency which it is desirable to maintain. In said Figure 4, an outer sheath of metal 2 is shown covering the core 1. This sheath is applied to the core after the core has been bent to the proper concavo-convex shape, and is made thoroughly adherent throughout the contact of the two. The method I employ of producing or applying this outer coating is that of electro-deposition. By such means the outer coating is deposited molecule by molecule and in such manner that the resultant outer layer is normally formed to the bent shape and in an entirely unstrained manner. This, then, is a coating perfectly adherent, which reinforces the inner core by opposing the flexure thereof with an unstrained structure, the convexed layer having advantage of position by its greater distance from the neutral axis of the combined shape, the concaved layer by its lesser distance from the neutral axis of the combined shape. The fibers of this outer structure will, therefore, bear a greater stress than the inner core, so that but an extremely thin coat of normally formed metal is needed in the outer sheath to bring the ultimate strength of the completed spring up to the requirements.

A further advantage lies in the use of electro-deposited metal for the outer sheathing, in that such formed metals are harder than the wrought form. In the case of nickel the electro-deposited form has twice the hardness of the wrought or cast form; and chromium, which ordinarily shows a Brinnell test of 500, when deposited electrically in a plating bath, cannot be touched (scratched) by a file. For this reason the electro-deposited layer 2 may be reduced to an extremely thin filmlike dimension and attain the desired result. Such a layer will develop a surprising amount of reinforcement in proportion to the thickness used. The actual thickness of the coating can be easily varied to meet the requirements.

One of the great advantages of a concavo-convex spring is its extreme flexibility in proportion to its strength, and, although this flexibility is advantageous in reducing the spring to a compact portable shape, the flexure is such that lacquers, varnishes and other compounds are not durable as protective coatings. The employment of the outer layer 2 as shown and described for Figure 4 when composed of both hard and noncorrosive metal provides the necessary adhesive protective coating to the steel base or core. When properly applied, an electroplated deposit of noncorrosive metal, such as nickel or chromium, furnishes an outer protection which is in such intimate contact, or junction, with the base or core, that it does not flake off or wear readily as do all compositions such as lacquer and similar nonmetallic compounds. The extreme molecular stress produced by the distortion of the spring flexure is sustained without serious effect by the electro-deposited coating. Separation at the area of junction of the inner core and outer layers does not take place since the contact is of such intimate nature as to be for all practical purposes as of one homogeneous piece.

In addition to the foregoing and in connection therewith, I have invented an improvement in the method of applying designs and characters to the surface of thin metal spring bodies; for example, flexible measures such as rules or tapes, whereby the visibility of such markings is increased, and the permanency of such quality is insured. It is a well known fact that the markings on steel tapes are difficult to read in dark localities; except where contrast has been obtained by brightening or polishing of one portion to offset coloration of another on new tapes. When tapes have become worn or stained by corrosion the numbers and graduations become faint and difficult to decipher.

In my invention I overcome the difficulty by means of electro-deposited coloration. Utilizing a base spring 1, Figure 3, which is of one color and stopping off the surface by means of a nonconducting material, wherever the design demands, I electroplate the remaining surface with a contrasting metallic deposit. Upon completing the electroplating, the nonconducting material may be removed by dissolving, or other means, leaving the contrasting base exposed in the form of the imposed design or markings 3. The strength of contrast is such as to be greatly superior to the common steel tape on the market today. The result is also quite permanent where the electro-deposit is non-corrosive metal, since wear and corrosion are practically excluded.

Obviously, two or more electro-plated coatings may be employed over the base metal to create the contrast instead of one; for example, a sheathing 2 may be placed over the entire base spring such as illustrated in Fig. 4 or on one side as shown in Fig. 6, this sheathing 2 being of a definite color. Upon this sheathing 2 I may stop-off a design or markings in the manner above described and deposit a second sheathing 2a of a different color from the first on the said first sheathing 2 to produce the color contrast between markings 3a and background 2a, when the nonconducting substance is removed, this method being clearly illustrated in Fig. 7. Color contrast can also be obtained by double electro-plating as illustrated in Fig. 8, wherein the process above described, relative to Fig. 3, may be employed to produce the sheathing 2, after which the sheathing 2 is stopped-off and the markings 3b filled by an electro-plated deposit of a different or contrasting color from that of the sheathing 2. By each of these methods, the entire base spring may be covered with a non-corrosive sheathing of electro-deposited metal and visible contrasting markings formed in the outer sheathing.

Obviously, these methods may be applied to flat rules with gratifying effectiveness, but I further improve the visibility of designs or characters for use in darkened localities by adapting the principle to the concavo-convex shape. By employing this form in conjunction with the electroplated coloration, above referred to, see Fig. 9, I am able to so reflect the light rays from various sources as to disperse them from one portion of the surface to another and thus heighten the illumination of the design by diffusion. Furthermore, rays impinging upon the bent surface can be reflected to the eye from more possible angles than if the surface presented were but a flat surface. That is, rays from any particular source such as "b", Figure 9, can be reflected to the eye of the observer "c" with the concavo-convex surface held at several angles; whereas, if the surface of the design were a simple plane, such rays could only reach the eye "c" from one angle. The use of this form of surface, therefore, improves the chance of reading the device, making the concavo-convex the superior in this respect.

By using thin films of electro-deposited metal for creating designs and markings as described above, I avoid the necessity of etching away a portion of the metal and thus preserve a practically uniform body of material from end to end, since the thickness of the deposit necessary to produce the effect of coloration, protection from corrosion, and strengthening, as above described, does not change the thickness in any manner comparable with the variation in thickness produced by etching, so commonly used. This improvement is particularly valuable for use in concavo-convex springs, since the material is excessively thin and subject to extreme distortion in coiling and uncoiling. For it is to be noted that the change in shape of the concavo-convex spring from a straight normal form to that of a coil is more complex than that of a flat tape. The alteration in shape of a flat tape moving from straight to a coiled form is simply one of longitudinal fiber change. The change involved in the movement of a concavo-convex spring or rule, see Figs. 1 and 2, creates an alteration in every direction, since the cross-section in the straight normal shape is curved, or bent, with the longitudinal section straight; and in the coiled shape the cross section is straight, while the longitudinal is curved. Therefore, it will be noted that as a concavo-convex spring is being coiled or uncoiled the spring strip is subjected to a localized multilateral flexure adjacent the point of tangency of the rectilinear portion with the coiled portion, and that the localized flexure progresses along the strip as the coiling and uncoiling of the strip progresses. Observation will prove that in this localized multilateral flexure of the strip the fibers of the structure in a concavo-convex rule or spring undergo alteration and strain in every direction during the process of coiling and uncoiling. Where a concavo-convex spring rule is made by etching out the characters and graduations, the irregularities in section due to the cutting away of certain portions of the material are brought into evidence during the action of coiling and uncoiling. Thin sections, by bending easier, offer less resistance to the force applied than do the thicker portions, thus creating an uneven movement. The employment of electroplated characters does away with any perceivable difference in thickness or unevenness in the movement during the process of coiling. Furthermore, the uniformity of section enables a thinner material to perform the same service as a heavier (thicker) material made by the etched process.

The term "markings" as employed throughout the specification and appended claims refers to any visible mark on the spring, produced by the electroplating of one part of the spring strip and leaving an adjacent part unplated; or by plating the previously mentioned unplated part with a plating of a contrasting color with respect to the previously plated part. In this way the characters and graduations may be produced, for example, in a dark color on a relatively lighter or bright background, or in a light or bright color on a relatively darker background.

I claim:

1. A coilable resilient rule comprising a metallic core of concavo-convex cross sectional form and a sheathing thereon of non-corrosive metal, and markings formed by omissions of said sheathing and extending from the face thereof to the underlying face of the said core.

2. A coilable resilient rule formed from a prepared thin ribbon of heat treated high carbon steel and bent thereafter beyond its elastic limit into a concavo-convex cross-sectional form and having a sheathing of non-corrosive metal deposited thereon by electro-plating after said bending so that said sheathing will be in a normal unflexed state.

3. A coilable resilient rule formed from a prepared thin ribbon of heat treated high carbon steel and bent thereafter beyond its elastic limit into a concavo-convex cross-sectional form and having markings formed thereon by means of a substance non-conductive of electricity deposited on said ribbon and a sheathing of non-corrosive metal deposited on said ribbon around said non-conductive substance by electro-plating, whereby a color contrast is produced between the areas covered by said non-conductive substance and the surrounding background.

4. A coilable resilient rule of the concavo-convex type comprising a metallic core and having markings formed thereon by depositing a substance non-conductive of electricity on said core and thereafter depositing on said core in such places as are not coated with said non-conductive substance a metal coating, by electro-plating, whereby a color contrast between said markings and the surrounding area is produced.

5. The process of producing and strengthening a coilable resilient rule having a concavo-convex cross-sectional form, comprising the use of a ribbon of high-carbon steel which has passed through a heat treatment to set its limit of elasticity at a predetermined point, bending such ribbon transversely beyond its established elastic limit and depositing a normal unflexed sheathing of metal on said bent ribbon by electro-plating substantially as described.

6. The process of producing and strengthening a coilable resilient rule having a base spring of concavo-convex cross-sectional form, comprising the use of a thin ribbon of high-carbon steel which has passed through a heat treatment to set its limit of elasticity at a predetermined point, bending said ribbon transversely beyond its established elastic limit, forming markings on said base by means of a substance non-conductive of electricity; and depositing a sheathing of metal on said base around the markings formed by said non-conducting substance by electro-plating.

7. The process of producing and strengthening a coilable resilient rule having a base spring of concavo-convex cross-sectional form, comprising the use of a thin ribbon of high-carbon steel which has passed through a heat treatment to set its limit of elasticity at a predetermined point, bending said ribbon transversely beyond its established elastic limit, forming markings on said base by means of a substance non-conductive of electricity; and depositing a sheathing of metal on said base around the markings formed by said non-conducting substance by electro-plating subsequently dissolving said non-conducting substance.

8. The process of producing and strengthening a coilable resilient rule having a base spring of concavo-convex cross-sectional form, comprising the use of a thin ribbon of high-carbon steel which has passed through a heat treatment to set its limit of elasticity at a predetermined point, bending said ribbon transversely beyond its established elastic limit, forming markings on said base by means of a substance non-conductive of electrictly; and depositing a sheathing of metal on said base around the markings formed by said non-conducting substance by electroplating, subsequently dissolving said non-conducting substance, and polishing said electro-plated sheathing to produce a light diffusing and reflecting surface in the area surrounding said markings, and forming a color contrast therebetween.

9. A coilable resilient rule of the concavo-convex type comprising a plurality of layers of metal, there being markings formed by omission of parts of the outermost layer, and extending entirely therethrough to the next underlying layer.

10. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultanenous multilateral flexure progressing longitudinally of the strip as the strip is being coiled, and markings superimposed on the strip and integrally united therewith to withstand said localized flexure.

11. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and markings comprising infinitesimally thin metal superimposed on the strip and integrally united therewith to withstand said localized flexure.

12. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and graduated markings comprising infinitesimally thin metal superimposed on the strip and integrally united therewith to withstand said localized flexure, said markings extending to the edge of the strip and, due to the minute thickness thereof, presenting with the strip a relatively smooth uniform edge devoid of injurious projections as the strip is coiled and uncoiled.

13. A coilable resilent measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and markings comprising infinitesimally thin metal superimposed on the strip and integrally united therewith as by electro-plating to withstand said localized flexure.

14. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and graduated markings comprising infinitesimally thin metal superimposed on the strip and integrally united therewith as by electro-plating to withstand said localized flexure, said markings extending to the edge of the strip and, due to the minute thickness thereof, presenting with the strip a relatively smooth uniform edge devoid of injurious projections as the strip is coiled and uncoiled.

15. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and an infinitesimally thin layer of metal superimposed upon the strip and integrally united thereto to withstand said localized flexure, there being markings formed by omissions of said superimposed metal layer and which extend from the outer face of said superimposed metal to the underlying face of the strip.

16. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and an infinitesimally thin layer of metal superimposed upon the strip and integrally united thereto to withstand said localized flexure as by electro-plating, there being markings formed by omissions of said superimposed metal layers and which extend from the outer face of said superimposed metal to the underlying face of the strip.

17. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and an infinitesimally thin layer of metal superimposed upon the strip and integrally united thereto to withstand said localized flexure, there being markings formed by omissions of said superimposed metal layer and which extend from the outer face of said superimposed metal to the underlying face of the strip and inwardly from one edge of the said strip, the minute thickness of said layer presenting with said strip a substantially smooth and uniform edge devoid of injurious projections as the strip is being coiled and uncoiled irrespective of the markings disposed along said edge.

18. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and markings superimposed on the strip and integrally united therewith to withstand said localized flexure and providing color areas contrasting to the surrounding areas for the purpose of making the markings prominent.

19. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and an infinitesimally thin layer of metal superimposed upon the strip and integrally united thereto to withstand said localized flexure, there being markings formed by omissions of said superimposed metal layer which extend from the outer face of said superimposed metal to the underlying face of the strip and providing color areas contrasting to the surrounding areas for the purpose of making the markings prominent.

20. A coilable resilient measuring device composed of a wafer-thin steel strip of substantially uniform thickness throughout, said strip normally being of a concavo-convex cross-sectional form which produces in said strip an inherent tendency to assume a longitudinally rectilinear state at all times, said strip being adapted when coiled to assume a transversely non-curved form, the change from the concavo-convex cross-sectional form to the transversely non-curved form being confined to an area immediately adjacent the point of tangency of the longitudinally rectilinear portion of the strip to the coiled portion thereof throughout the coiling operation, thereby effecting in said strip a localized simultaneous multilateral flexure progressing longitudinally of the strip as the strip is being coiled, and markings superimposed on the strip and integrally united therewith to withstand said localized flexure and providing adjacent areas of contrasting colors one of which is of a light reflecting nature to accentuate the markings.

21. A coilable resilient concavo-convex rule comprising a metallic core of predetermined color, a metallic sheathing for said core of contrasting color, and markings formed by omissions of said sheathing and extending from the face thereof to the underlying face of said core, whereby a color contrast between said markings and the surrounding area is produced to make the markings prominent.

HIRAM A. FARRAND.